US010181230B2

(12) United States Patent
Esposito

(10) Patent No.: US 10,181,230 B2
(45) Date of Patent: Jan. 15, 2019

(54) SYSTEM AND METHOD FOR CONTROLLING ACCESS AT ACCESS POINT

(71) Applicant: Sensormatic Electronics, LLC, Boca Raton, FL (US)

(72) Inventor: Robert Esposito, Westford, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/492,490

(22) Filed: Apr. 20, 2017

(65) Prior Publication Data

US 2018/0308303 A1 Oct. 25, 2018

(51) Int. Cl.
| | |
|---|---|
| *G07C 9/00* | (2006.01) |
| *H04W 4/02* | (2018.01) |
| *H04W 12/08* | (2009.01) |
| *H04H 20/16* | (2008.01) |
| *H04W 12/06* | (2009.01) |
| *H04W 40/24* | (2009.01) |

(52) U.S. Cl.
CPC ......... *G07C 9/00111* (2013.01); *H04W 4/023* (2013.01); *H04W 4/027* (2013.01); *H04W 12/08* (2013.01); *H04H 20/16* (2013.01); *H04W 12/06* (2013.01); *H04W 40/244* (2013.01)

(58) Field of Classification Search
CPC ............................ G07C 9/00111; H04W 4/023

USPC .................................. 340/5.5–5.55, 5.6–5.64
See application file for complete search history.

(56) References Cited

U.S. PATENT DOCUMENTS

| | | | | |
|---|---|---|---|---|
| 5,026,990 | A * | 6/1991 | Marman ................ | G08B 13/19 250/342 |
| 7,760,091 | B2 * | 7/2010 | Comerford ......... | E05B 19/0005 340/568.1 |
| 9,568,902 | B2 * | 2/2017 | Dunn ...................... | G06F 3/016 |
| 9,767,630 | B1 * | 9/2017 | Kazerani ............. | G07C 9/00111 |
| 2015/0379862 | A1 * | 12/2015 | Jones, Jr. ......... | G08B 13/19645 348/153 |
| 2017/0148241 | A1 * | 5/2017 | Kerning ................ | H04W 4/12 |
| 2017/0220242 | A1 * | 8/2017 | Dunn ................. | G06F 3/04883 |

\* cited by examiner

*Primary Examiner* — Allen T Cao
(74) *Attorney, Agent, or Firm* — HoustonHogle LLP

(57) ABSTRACT

A security system uses wireless access control readers that determine locations of beacon devices relative to thresholds of access points, a verification system for validating user information for users, and beacon devices that monitor for an activation input from their users and that signal the wireless access control readers when the activation input is received. The access point is then controlled based on the user information and the receipt of the activation input by the beacon devices. This addresses the problem of how the system infers intent at an access point. The security system no longer has to infer intent from possibly poor information concerning the location and movement of the users. Instead, the security system can simply determine gross proximity to the access point and then wait for the activation input.

19 Claims, 3 Drawing Sheets

SYSTEM AND METHOD FOR CONTROLLING ACCESS AT ACCESS POINT

BACKGROUND OF THE INVENTION

Access control systems in buildings, for example, are principally concerned with physical security and the selective access to, restriction of, and/or notification of access to a place or other resource through as access point. Historically, the main components of the access control systems were the verification system, access control readers and possibly door or elevator controllers. The access control readers were often installed to enable presentation of credentials to obtain access to restricted areas, such as buildings or areas of the buildings. The readers were installed near access points, such as doors or hallways or elevator doors.

Typically, individuals would interact with the access control readers by swiping keycards or bringing contactless smart cards within range (approximately 2-3 inches or 5 centimeters) of the reader. The access control readers would read the credential information of the keycards and forward the information 5o the verification system, which then confirmed the credentials against a verification database. The verification system determined if the individuals were authorized to access the restricted areas. If the individuals were authorized, then the access control readers might signal door controller to unlock doors or not generate alarms or activate elevators, to list a few examples.

More recently, frictionless access control systems are being proposed and designed. These systems typically rely on individuals carrying beacon devices that can broadcast credentials, such as dedicated fob devices or personal mobile computing devices, such as tablet or smart phone computing devices. The access control systems will then monitor and track the individuals as they move through the buildings and automatically open access points such as doors when approached, assuming that the individuals are authorized to pass through those access points.

SUMMARY OF THE INVENTION

When security systems implement more "frictionless" operation, the intention of the individuals to enter or cross the access point, for example, is inferred to some or even a large extent. Because the systems are frictionless, the individual may not have made any overt gesture indicating a desire to access the restricted area, e.g., the individuals did not swipe a keycard.

In some previous systems, the intention of the users was interred by how the users approached the access point and possibly lingered at a threshold of the access point. There are at least two problems with this approach, however.

First, lingering at the threshold of an access point is generally an imperfect gauge of the intent of the user. While in many circumstances a user standing at the threshold means that the user wants to enter or pass through the access point, it could also be possible that the user happens to be involved in a conversation at or near the threshold.

A second problem arises from the fact that the position determination may be inaccurate. Many frictionless access control systems are implemented on established wireless data exchange protocols. Bluetooth standard, for example, operates in the GigaHertz radio frequencies. These frequencies are prone to signal reflections from metal objects that might surround the threshold of the access point and signal attenuation based on how the user is carrying the beacon device. For example, if the beacon devices in the user's back pocket, then the user's body will attenuate the signal received by the reader. As a result, it might appear to the reader that the user is more remote than they actually are.

The present invention addresses this problem by having the beacon devices monitor for an activation input from their users. When this activation input is received, the beacon devices signal the readers. As a result, the security system no longer has to infer intent from possibly poor information concerning the location and movement of the users. Instead, the security system can simply determine gross proximity to the access point and then wait for the activation input.

In general, according to one aspect, the invention features a security system. It comprises wireless access control readers that determine locations of beacon devices relative to thresholds of access points, a verification system for validating user information for users, and beacon devices that both monitor for an activation input from their users and signal the wireless access control readers when the activation input is received. The access point is then controlled based on the user information and the receipt of the activation input by the beacon devices.

In different examples, the activation input can take a number of different forms. For example, it can be detected by an accelerometer of the beacon devices. The activation input can then be a predetermined pattern of manipulation of the beacon devices, such as tapping the beacon devices in a predetermined pattern and/or rotating the orientation of the beacon devices in a predetermined pattern.

The activation input could also be detected by a microphone of the beacon devices. It could be a predetermined spoken phase.

In one implementation example, the beacon devices monitor for the activation input and compare received input to a stored predetermined pattern to validate the activation input. In another example, the beacon devices monitor for the activation input and send a received input to the wireless access control readers which obtain validation of the received input against a stored predetermined pattern.

In general, according to one aspect, the invention features a method for controlling an access point. This method comprises determining locations of beacon devices relative to thresholds of access points, validating user information for users, the beacon devices monitoring for an activation input from their users, and controlling the access point based on the user information and the receipt of the activation input by the beacon devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however; be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
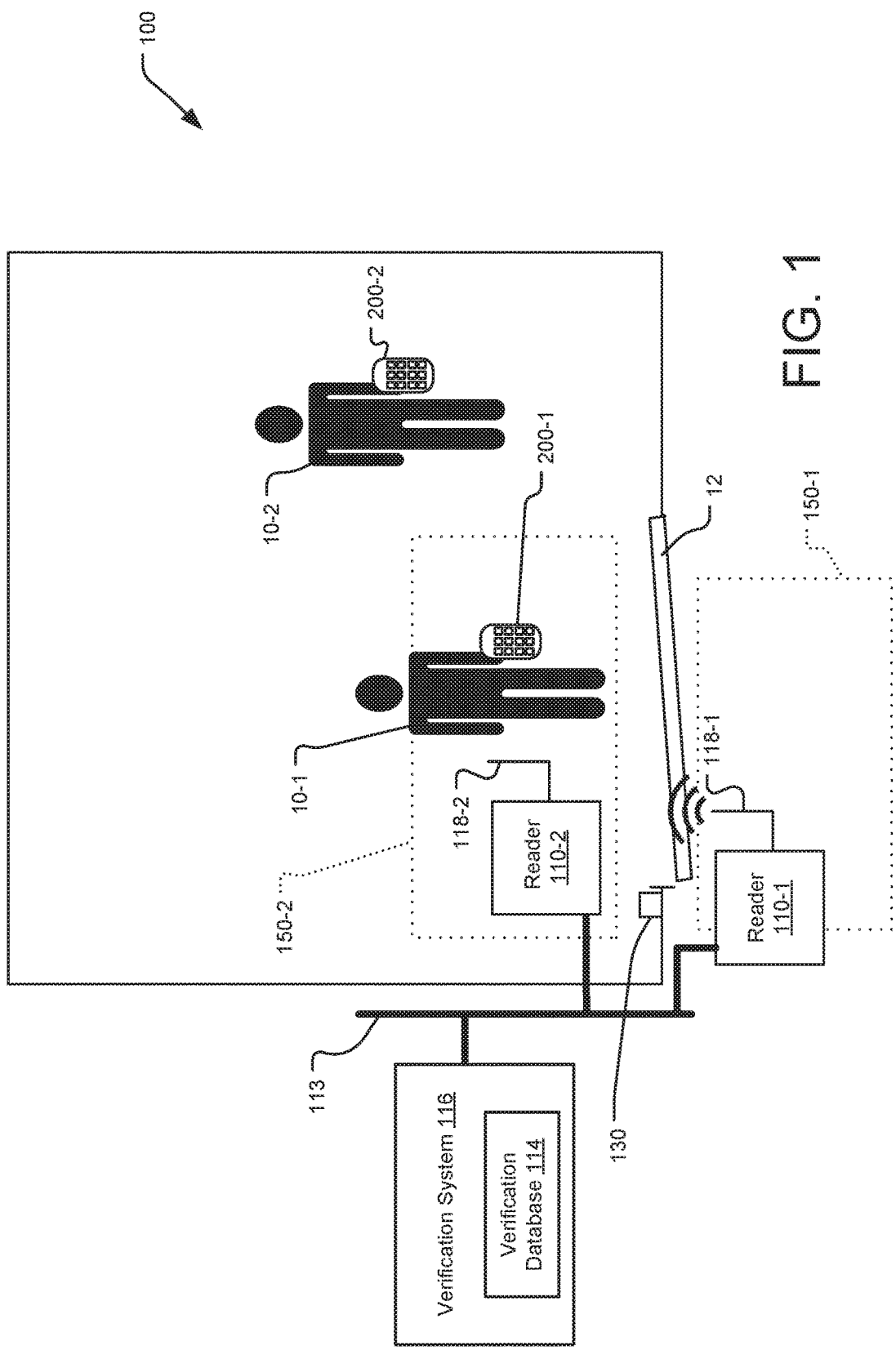
FIG. 1 is a schematic diagram showing a security system with an access control system, using a wireless access control readers at an access point.

FIG. 1 is a block diagram of an exemplary security system 100 and particularly an access control system that identifies individuals/users 10, tracks locations of beacon user devices 200 such as fobs, smart phones or other mobile computing devices, and monitors access to restricted or different areas of a building, for example, through access point 12, such as a door, elevator, hallway, and/or other controlled portal.

The access control system includes wireless access control readers 110 that are typically installed in rooms or hallways or front doors or other locations in the buildings. In the illustrated example, two wireless access control readers 110-1, 110-2 are installed in connection with the door access point 12, on either side of the door.

The wireless access control readers 110-1, 110-2, in one implementation, each have a respective antenna system 118-1, 118-2 that enables the wireless access control readers 110-1, 110-2 to determine locations of the user devices relative to the access point 12, in some example, and also receive beacon transmissions and other broadcasts from the user devices 200-1, 200-2, which include user information of the respective users 10-1, 10-2.

Different technologies could be used to locate the user devices relative to the access points 12. For example, indoor GPS systems that rely on multiple antennas and triangulation are one example. Indoor LIDAR is another example.

In other examples, each of the wireless access control readers 110-1, 110-2 uses a combination of antennas including directional antennas that enable it to preferentially detect signals or emissions from user devices 200 that are located at the thresholds 150 of the access point 12. In specific implementation, the wireless access control readers 110-1, 110-2 might each include an omnidirectional antenna and a directional antenna, which are installed in a ceiling above the access point 12. In another example, the directional antenna could be installed in the floor and directed toward the ceiling. Still other examples, the directional antenna might be directed from the ceiling or floor at an oblique or slant angle but directed at the threshold 150-1, 150-2.

In still other examples, the readers 110-1, 110-2 and/or the user devices 200-1, 200-2 could rely on other technology to determine that the users are near or at the thresholds 150-1, 150-2. Simple devices such as pressure plates or electronic eye photo sensors could be employed by the readers 110-1, 110-2. In other cases, image analytics systems perform analysis of video feeds from nearby surveillance cameras and these systems then signal the readers 110-1, 110-2 when users near and/or enter thresholds 150. In still other examples, the proximity of the users is determined using three dimensional infrared sensor system. In some of these cases, the readers 110-1, 110-2 determine the proximity. In other cases, the user devices 200-1, 200-2 determine proximity to the thresholds using computer vision and then signal the readers 110-1, 110-2 as the users approach and/or enter the thresholds 150.

Nevertheless, the antenna systems 118-1, 118-2 of the wireless access control readers 110-1, 110-2 detect emissions from beacon devices 200-1, 200-2 such as mobile computing devices carried by the individuals 10-1, 10-2 typically standing at or near one of the thresholds 150-1, 150-2 of the access point 12.

The radiofrequency beacon emissions detected by the antenna systems 118-1, 118-2 are decoded and processed by the respective wireless access control readers 110-1, 110-2. In one embodiment, the beacon devices 200-1, 200-2 broadcast using BLE (Bluetooth low energy) technology. Bluetooth is a wireless technology that operates in a 2.4 GHz (gigahertz) short-range radio frequency band. A lower power version of standard Bluetooth called Bluetooth Low Energy (BLE), in contrast, consumes between ½ and ¹/₁₀₀ the power of classic Bluetooth. BLE is optimized for devices requiring maximum battery life instead of higher data transfer rates associated with classic Bluetooth. BLE has a typical broadcast range of about 100-150 feet (approximately 35-46 meters). In other examples, however, the directional antenna detects other radiofrequency or optical emissions. Alternative implementations include other wireless technologies such as Wi-Fi (IEEE 802.11), active RFID (radio frequency identification), or ZigBee, LiiFi, or ultra-wideband (UWB) to list a few examples.

In general, the wireless access control readers 110-1, 110-2 determine whether individuals are at the thresholds 150-1, 150-2 of the access point 12, which event may give rise to the generation of a security event based on any policies or business rules.

In the illustrated example, the wireless access control readers 110-1, 110-2 receive user information, such as security credentials, broadcast by the beacon devices 200-1, 200-2. This information is forwarded to verification system 116, in one example, that validates the information and verifies that the individuals 10-1, 10-2 to which those beacon devices 200-1, 200-2 are assigned are authorized to enter or transit the access point 12.

Specifically, in one example, the verification system 116 identities the beacon devices 200-1, 200-2 based on their emissions and then the individuals 10-1, 10-2 to which those beacon devices 103 are assigned by reference to credential information stored in a verification database 114.

Based on the security credentials of the associated individuals 10-1, 10-2, the verification system 116 determines whether those individuals are authorized to transit the access point 12.

According to the invention, the beacon devices 200-1, 200-2 further monitor for an activation input from their respective users 10-1, 10-2. This activation input could take a number of different forms in different embodiments or even in the same system. In a preferred embodiment, the activation input is a predetermined tapping or manipulation of the beacon devices 200. As an example, the user might have an activation input that corresponded to a dot-dash input as in the form of Morse code by tapping on their beacon device 200. Preferably, each user 10 establishes their own activation input such that it functions similar to a password.

In other embodiments, however, different activation inputs might be utilized. For example in one embodiment, the activation input could be a spoken phrase or predetermined sound, which is detected by the beacon device 200. In other examples, the activation input could be a predetermined pattern drawn by the user on the touchscreen display of their beacon device 200.

In each of these embodiments, the beacon device 200 monitors for the activation input and then signals the wireless access control readers 110-1, 110-2 upon receiving the activation input.

Upon receipt of the activation input and a determination by the verification system 116 that the user information is valid and the user 10 is authorized to transit the access point 12, then access through the access point is provided. In different examples, this might include unlocking the door via control of a door controller 130 or activation of an elevator via an instruction sent to its controller or the non-generation of an alarm as the user passes through the access point 12, to list a few examples.

Figure 2:
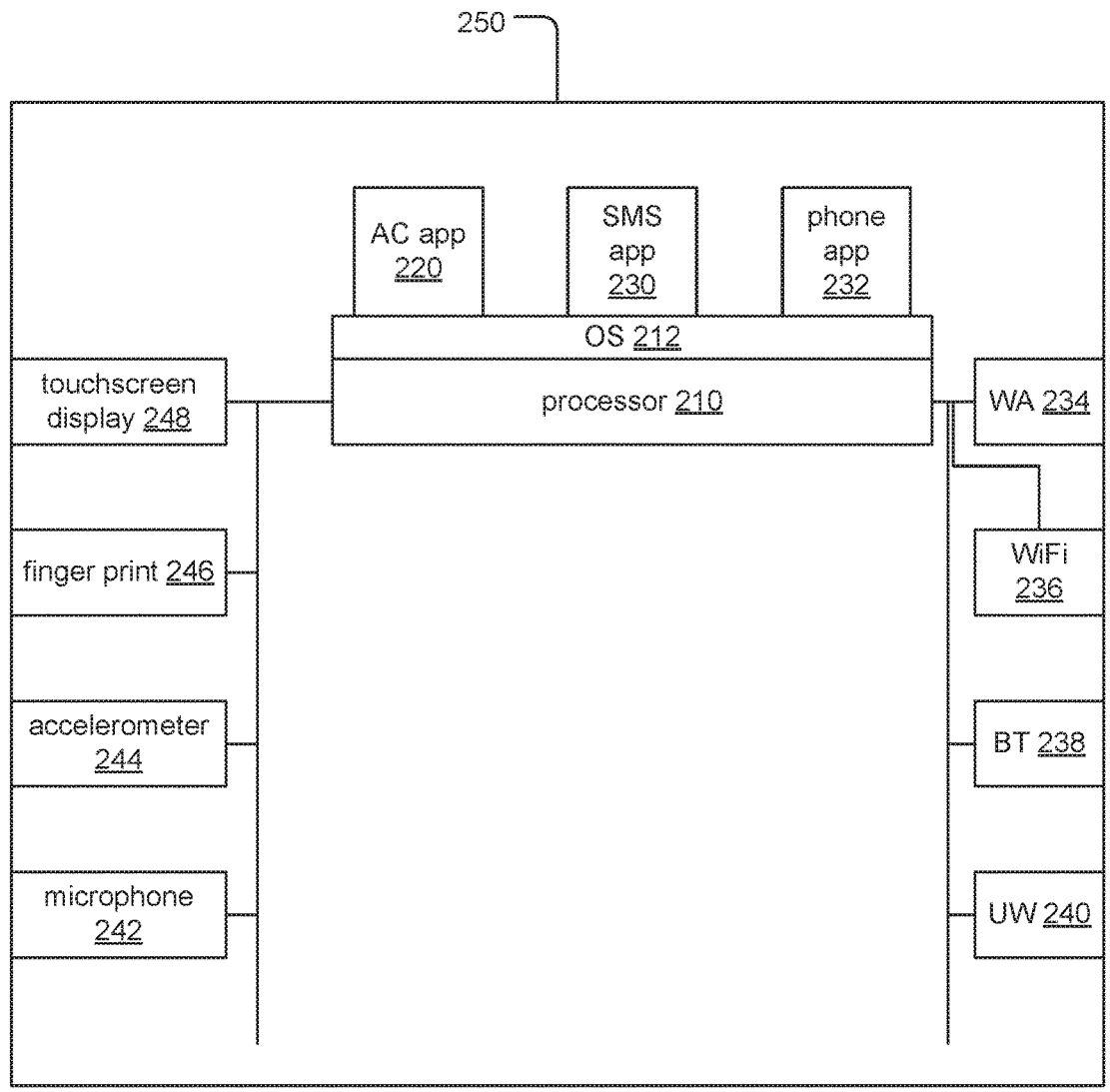
FIG. 2 is a block diagram showing an access control app executing on a beacon device.

FIG. 2 illustrates a block diagram of a beacon device 200. In the illustrated example, the beacon device 200 is a smart phone or tablet mobile computing device.

As is common, the beacon device 200 includes a central processing unit 210. An operating system 212, such as Android operating system by Google, Inc. or OSx operating system provided by the Apple Corporation, executes on the processor 200. Generally, the operating system 212 provides access to a number of hardware devices of the beacon device 200 for application programs or apps executing on the operating system 212.

In the illustrated example, a number of example apps execute on the operating system 212. A short message service (SMS) app 230 executes on the operating system 212 to enable text communications for the user. Further, a cellular phone app 232 also executes on the operating system 212. These apps are provides as examples that are ubiquitous to devices 200 that are based commodity mobile computing devices. In a typical example, the SMS app 230 and phone at 232 transmit messages and maintain voice calls via a wide area (cellular) network interface 234 typically to the cellular phone system.

According to the invention, and access control (AC) app 220 also executes on the operating system 212. The AC app generally has access or stores the user information such as the user's credentials. In one embodiment, the AC app transmits those user credentials via the Bluetooth wireless interface 238 to the wireless access control readers 110. In other examples, however, the AC app 220 broadcasts or transmits the user information via a Wi-Fi wireless interface 236 or possibly an ultra wideband (UWB) wireless interface 240.

According to an embodiment of the invention, the AC app 230 also monitors one or more of hardware components for the activation input from the user. In one example, the activation input is provided by the user tapping the housing 250 of the beacon device 200. This tapping is detected by an accelerometer 244 of the device 200. In another example, the activation input is provided by the user by tapping or drawing a predetermined pattern on the touchscreen display 248. In still another example, the activation input is provided by the user by the user placing a finger on a fingerprint scanner 246 of the beacon device 200. In still another example, the AC app 220 monitors the microphone 242 of the beacon device 200 for a predetermined spoken phrase or noise.

When this activation input is detected by the AC app 230, then the AC app indicates it is received by broadcast through one of the wireless radio frequency interfaces including the Wi-Fi interface 236, the Bluetooth interface 238, and/or the ultra wideband wireless interface 240.

Figure 3:
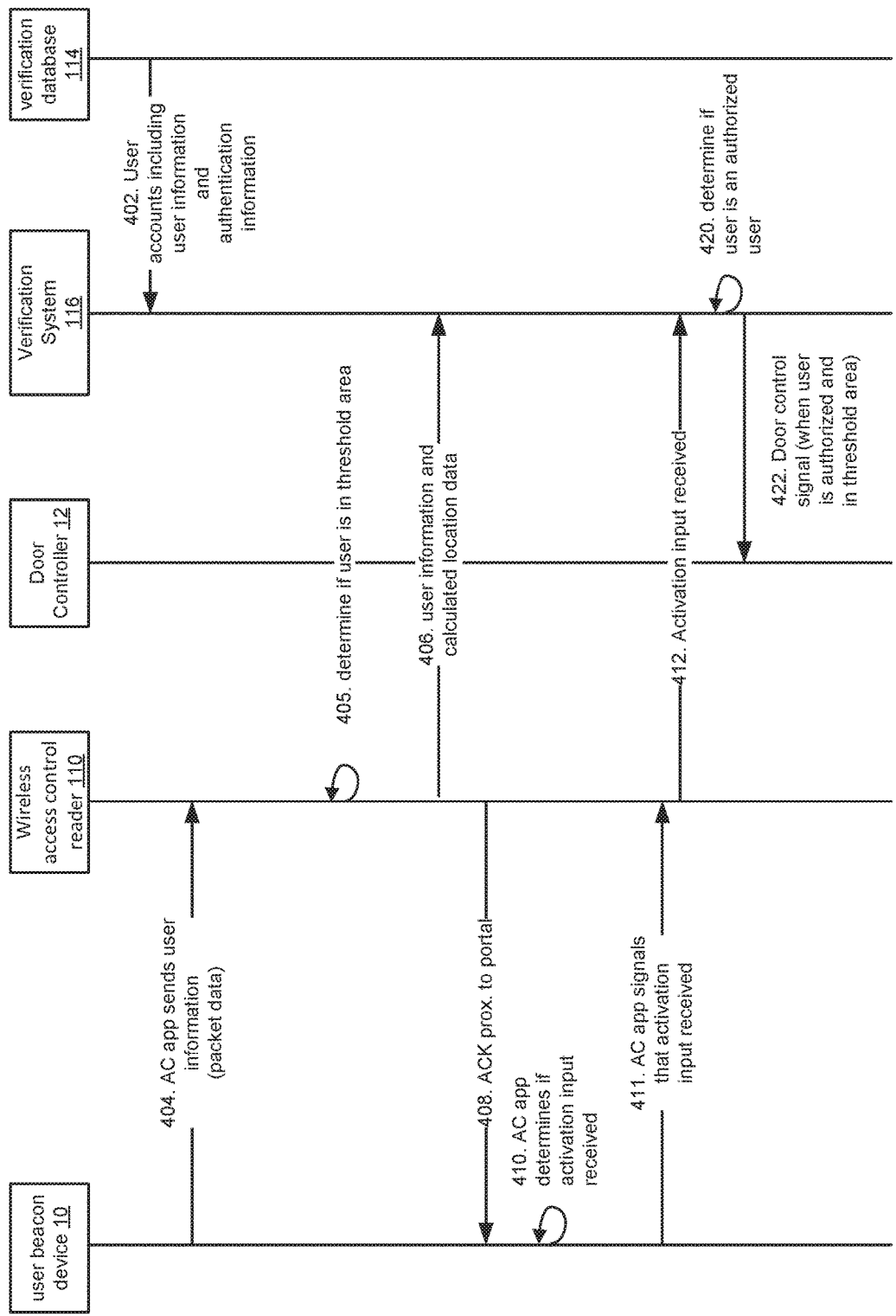
FIG. 3 is a sequence diagram showing the interaction between the beacon device, wireless access control reader; and a verification system.

FIG. 3 shows component interactions for an exemplary implementation of the system 100. In this implementation, the verification system 116 sends a door signal to the door controller 130 to unlock the door access point 12 in response to authorization of the user 10 after the user has entered one of the threshold areas 150-1, 150-2 and the activation input has been received by the beacon device 200 by its user 10.

In more detail, in step 402, user information including credentials are stored in a verification database 114 and used or provided by the verification system 116 to validate users. This user information might be cached at the level of the readers 110 or elsewhere. This updates local "caches" of user information to enable faster operation.

In step 404 and generally on a continuous/periodic basis and/or when specifically approaching an access point, the AC apps 220 executing on the beacon devices 200-1, 200-2 broadcast wireless signals including user information, and the wireless access control readers 118-1, 118-2 detect the wireless signals and extract the user information. Additionally, the wireless access control readers 118-1, 118-2 calculate or otherwise determine the location of the beacon devices 200-1, 200-2, and/or determine if the beacon devices 200-1, 200-2 (and therefore if the users) are in or near any of the threshold areas 150-1, 150-2, in step 405.

The user information and possibly the location data are then sent to the verification system 116 for validation or the user information is validated against information previously provided by the verification system in step 406.

According to step 408, the wireless access control readers 118-1, 118-2 might acknowledge (ACK) when they detect that one of the beacon devices 200-1, 200-2 is proximate to the access point and/or within the threshold 150-1, 150-2.

Continuously, or in response to receiving the acknowledgment from one of the access control readers 118-1, 118-2, the AC app 220 executing on the processor 210 of the beacon device 200 monitors for the activation input from its user. For example, in one specific embodiment, the activation input might be a series of taps on the housing 250 of the beacon device 200 with long and short delays between those taps or one or more of the other activation inputs previously described herein.

In one embodiment, the AC app 220 compares the detected activation input from the user to a previously stored activation input that was provided by the user as part of an initialization process. In this way, the AC app 220 validates that the user has entered the proper activation input. In other examples, the AC app 220 monitors for an activation input but then sends that activation input to the access control readers 118-1, 118-2 in the form of a wireless transmission that is then validated against a stored activation input associated with the user data by the reader 118 and/or verification system 116.

In the illustrated embodiment, the AC app 220 determines if the activation input was received in step 410. The AC app 220 then signals the access control readers 118-1, 118-2 in step 410 that the activation input was received from its user.

Then, in step 412, in the illustrated embodiment, the access control readers 118-1, 118-2 notify the verification system 116 that the activation input was received at the beacon devices 200-1, 200-2.

In step 420 or earlier, user information is validated and it is determined whether the user is authorized for the access point 12. In the illustrated example, the verification system 116 compares the user information forwarded from the access control readers 118-1, 118-2. If required, the verification system 116 may confirm user status and account information against the verification database 114 if the users' information have not been previously sent to the verification system 116. In other examples the validation and authorization is performed at the readers 110 based on information previous cached on the readers from the verification system.

In other examples, the activation input is also validated at the level of the readers 130 or verification system 116 based on information stored in the users account on the verification database 114.

If the authorization information indicates that the user is allowed access to the access point 12, and activation input was received at the beacon device 200, the verification system 116 possibly signals a door controller 130 in step 422 to unlock the door, for example.

In this way, the activation input is utilized as a way of inferring the intent of the user to transit the access point.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:
   wireless access control readers that determine locations of beacon devices relative to thresholds of access points;
   a verification system for validating user information for users; and
   beacon devices that monitor for an activation input from their users and that signal the wireless access control readers when the activation input is received;
   wherein the access point is controlled based on the user information and the receipt of the activation input by the beacon devices; and
   wherein the beacon devices monitor for the activation input and compare received input to a stored predetermined pattern to validate the activation input.

2. The system of claim 1, wherein the activation input is detected by an accelerometer of the beacon devices.

3. The system of claim 1, wherein the activation input is a predetermined pattern of manipulation of the beacon device.

4. The system of claim 3, wherein the predetermined pattern of manipulation includes tapping the beacon devices in a predetermined pattern.

5. The system of claim 3, wherein the predetermined pattern of manipulation includes rotating the orientation of the beacon devices in a predetermined pattern.

6. A security system, comprising:
   wireless access control readers that determine locations of beacon devices relative to thresholds of access points;
   a verification system for validating user information for users; and
   beacon devices that monitor for an activation input from their users and that signal the wireless access control readers when the activation input is received, wherein the activation input is detected by a microphone of the beacon devices; and
   wherein the access point is controlled based on the user information and the receipt of the activation input by the beacon devices.

7. The system of claim 6, wherein the activation input is a predetermined spoken phase.

8. The system of claim 6, wherein the beacon devices monitor for the activation input and send a received input to the wireless access control readers which obtain validation of the received input against a stored predetermined pattern.

9. A method for controlling an access point, comprising:
   determining locations of beacon devices relative to thresholds of access points;
   validating user information for users;
   the beacon devices monitoring for an activation input from their users by detecting the activation input with a microphone of the beacon devices; and
   controlling the access point based on the user information and the receipt of the activation input by the beacon devices.

10. The method of claim 9, further comprising the beacon devices signaling the wireless access control readers when the activation input is received.

11. The method of claim 9, further comprising the beacon devices comparing received input to a stored predetermined pattern to validate the activation input.

12. The method of claim 9, further comprising the beacon devices sending a received input to wireless access control readers which obtain validation of the received input against a stored predetermined pattern.

13. The method of claim 9, wherein the activation input is a predetermined spoken phase.

14. A method for controlling an access point, comprising:
   determining locations of beacon devices relative to thresholds of access points;
   validating user information for users;
   the beacon devices monitoring for an activation input from their users by detecting the activation input with an accelerometer of the beacon devices;
   controlling the access point based on the user information and the receipt of the activation input by the beacon devices.

15. The method of claim 14, wherein the activation input is a predetermined pattern of manipulation of the beacon device.

16. The method of claim 15, wherein the predetermined pattern of manipulation includes tapping the beacon devices in a predetermined pattern.

17. The method of claim 15, wherein the predetermined pattern of manipulation includes rotating the orientation of the beacon devices in a predetermined pattern.

18. The method of claim 14, further comprising the beacon devices comparing received input to a stored predetermined pattern to validate the activation input.

19. The method of claim 14, further comprising the beacon devices sending a received input to wireless access control readers which obtain validation of the received input against a stored predetermined pattern.

* * * * *